(12) United States Patent
Lee et al.

(10) Patent No.: US 12,441,471 B2
(45) Date of Patent: Oct. 14, 2025

(54) BIDIRECTIONAL LATCH

(71) Applicant: GOODRICH CORPORATION, Charlotte, NC (US)

(72) Inventors: Brandon Lee, Jamestown, ND (US); Aaron J. Roberts, Jamestown, ND (US); Michael Schuh, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 691 days.

(21) Appl. No.: 17/845,611

(22) Filed: Jun. 21, 2022

(65) Prior Publication Data
US 2023/0407688 A1    Dec. 21, 2023

(51) Int. Cl.
*B64D 9/00* (2006.01)
*B64D 11/00* (2006.01)

(52) U.S. Cl.
CPC .......... *B64D 9/003* (2013.01); *B64D 11/003* (2013.01)

(58) Field of Classification Search
CPC ........ B64D 9/003; B64D 11/003; B64D 9/00; B64D 11/00; B64C 1/20; B64C 1/22; B64C 25/10; B60P 7/13; B60P 7/0807; B60P 7/0892; B60P 7/08
See application file for complete search history.

(56) References Cited

U.S. PATENT DOCUMENTS

| | | | | |
|---|---|---|---|---|
| 3,800,713 A | * | 4/1974 | Nordstrom | B60P 7/13 410/79 |
| 3,995,562 A | * | 12/1976 | Nordstrom | B60P 7/13 410/79 |
| 4,144,821 A | | 3/1979 | Lang | |
| 5,957,406 A | * | 9/1999 | Nelson | B64D 9/00 410/86 |
| 6,425,717 B1 | * | 7/2002 | Saggio | B63B 25/004 410/79 |
| 9,809,147 B2 | | 11/2017 | Guo et al. | |
| 2002/0131837 A1 | * | 9/2002 | Segura | B60P 7/13 410/77 |

FOREIGN PATENT DOCUMENTS

CN    104442878 X    3/2015

* cited by examiner

*Primary Examiner* — Amy R Weisberg
*Assistant Examiner* — Philip Charles Adams
(74) *Attorney, Agent, or Firm* — SNELL & WILMER L.L.P.

(57) ABSTRACT

A bidirectional latching device for securing a cargo in a vehicle may have a latch catch assembly and a latch head. The latch catch assembly may selectably engage with the latch head. When engaged with the latch head, the latch catch assembly may lock the latch head in position to resist movement and the latch head may secure the cargo in the vehicle. When disengaged from the latch head, the latch catch assembly may release the latch head and the latch head may move to a stowed position. The latch catch assembly may lock the latch head to resist movement in one or more directions of movement. The latch head may be shaped to secure the cargo in the vehicle in at least two directions. Thus, cargo may be secured more efficiently by requiring a reduced number of latch devices because the disclosed latch device is bidirectional.

19 Claims, 12 Drawing Sheets

BIDIRECTIONAL LATCH

FIELD

The present disclosure relates generally to a latch and more particularly, to a bidirectional latch useful in securing loads.

BACKGROUND

In vehicle cargo handling, latches are useful to secure cargo. For instance, latches may be attached to a vehicle floor and may be operable to secure or unsecure loads being carried by the vehicle. Due to movement of the vehicle, cargo may be desired to be secured in multiple different degrees of freedom ("directions of movement"). For instance, cargo may be desired to be prevented from moving forward and aft (a "direction of movement") or left and right (also a "direction of movement"). Cargo may be desired to be prevented from lifting from the floor (a further "direction of movement"). Prior efforts to address cargo securement include using straps, ropes, and combinations of multiple different latches to secure the cargo in multiple different directions of movement. These approaches can be slow to engage and disengage. For instance, knotting and unknotting a tie down rope may slow the loading and unloading process. Implementation of multiple latches to address multiple different directions of movement requires complex arrangements and limits cargo capacity and flexibility. Thus, there is a need for systems, methods, and apparatuses for latches that can secure cargo in multiple directions of movement with a single latch and provide for rapid engagement and disengagement of the latch.

SUMMARY

A bidirectional latching device is provided. The latch device may be for securing a cargo in a vehicle. The bidirectional latching device may include a latch catch assembly and a latch head. The latch catch assembly may include a first pawl arm. The first pawl arm may be an arm rotatably extending from a first hinge at a first end of the arm and having a first pawl adjacent a second end of the arm.

The latch head may include a first force reaction arm and a cargo retention flange. The first force reaction arm may be an arm rotatably extending from a first latch head hinge at a first end. In various embodiments, the first force reaction arm defines a first locking slot adjacent a second end of the first force reaction arm. The first locking slot may be configured to receive the first pawl into the first locking slot to prevent rotation of the first force reaction arm about the first latch head hinge in both clockwise and counterclockwise directions. The cargo retention flange may be extending outwardly from the second end of the first force reaction arm. The cargo retention flange may restrict movement of the cargo proximate to the bidirectional latching device in response to the receiving the first pawl into the first locking slot.

In various embodiments, the bidirectional latching device may include further features. For instance, the bidirectional latching device may include one or more of the following aspects. In various embodiments, the cargo retention flange includes a first dimensional restraint member and a second dimensional restraint member. The first dimensional restraint member may restrict movement of the cargo in a first direction of movement. The second dimensional restraint member may be perpendicular to the first dimensional restraint member. The second dimensional restraint member may restrict movement of the cargo in a second direction of movement that is perpendicular to the first direction of movement. In various embodiments, the first dimensional restraint member and the second dimensional restraint member form a T-shape.

The bidirectional latching device may include a base. The base may be a platform supporting the first hinge and the first latch head hinge in fixed spaced apart relation as the first hinge rotates and the first latch head hinge rotates independently of the first hinge. The first hinge and the first latch head hinge may be spaced so that the first force reaction arm and the first pawl arm are at about a perpendicular angle when the first pawl is in the first locking slot. The latch catch assembly may include a first handle arm extending from the first latch head hinge. The first handle arm may extend at an acute angle relative to the first force reaction arm. A handle may be disposed at an end of the first handle arm opposite the first latch head hinge. The first handle arm and the first force reaction arm may both extend away from the base. The first hinge may be spring loaded to impel the first pawl toward the first locking slot. The first latch head hinge may be rotatable in response to a force on the first handle arm to disengage the first pawl from the first locking slot.

In various embodiments, the latch catch assembly has a second pawl arm. The second arm may be an arm rotatably extending from a second hinge at a first end of the arm and having a second pawl adjacent a second end of the arm. The latch head has a second force reaction arm. The second arm may be an arm rotatably extending from a second latch head hinge at a first end. In various embodiments, the second force reaction arm defines a second locking slot adjacent a second end of the second force reaction arm to receive the second pawl into the second locking slot to prevent rotation of the second force reaction arm about the second latch head hinge in both clockwise and counterclockwise directions. The base that is the platform may further support the second hinge and the second latch head hinge in fixed spaced apart relation as the second hinge rotates and the second latch head hinge rotates independently of the first hinge. The first hinge and the second hinge may rotate in concert. The first latch head hinge and the second latch head hinge may rotate in concert.

In various embodiments the latch catch assembly may include a second handle arm extending from the second latch head hinge. The second handle arm may extend at the acute angle relative to the second force reaction arm. The handle extends between the end of the first handle arm opposite the first latch head hinge and an end of the second handle arm opposite the second latch head hinge. The first handle arm and the second handle arm are parallel and spaced apart. The second handle arm and the second force reaction arm both extend away from the base. The second force reaction arm and the first form reaction arm are parallel and spaced apart. The second force reaction arm may be spring loaded to impel the second pawl toward the second locking slot. The first latch head hinge and the second latch head hinge may be rotatable in concert in response to a force on the handle extending between the first handle arm and the second handle arm to disengage the first pawl from the first locking slot and the second pawl from the second locking slot.

An aircraft cargo retention system is provided. The system may include a cargo compartment floor of an aircraft, a plurality of rollers attached to the cargo compartment floor to support a first cargo item and a second cargo item, and a bidirectional latching device attached to the cargo compartment floor and configured to selectably extend upward from the cargo compartment floor to restrict lateral movement and up-and-down movement of both the first cargo item and the second cargo item.

In various embodiments, the aircraft cargo retention system may include further aspects. For instance, the bidirectional latching device of the aircraft cargo retention system may include a latch head and a latch catch assembly. The latch head may have a T-shape and extending upwardly from the cargo compartment floor. The latch head may be rotatable about a first latch head hinge. In various embodiments, the latch catch assembly may be configured to selectably engage with the latch head to prevent rotation of the latch head about the first latch head hinge while restricting the lateral movement and the up-and-down movement of both the first cargo item and the second cargo item.

A method of securing cargo in a cargo compartment floor of an aircraft is provided. The method may include slidably supporting a first cargo item on at least a portion of rollers of a plurality of rollers. The method may include selectably extending a bidirectional latching device attached to the cargo compartment floor between the first cargo item and a second cargo item upwardly from the cargo compartment floor. The method may include slidably supporting the second cargo item on at least a second portion of rollers of the plurality of rollers. The method may include restricting lateral movement of both the first cargo item and the second cargo item by the bidirectional latching device. Finally, the method may include restricting up-and-down movement of both the first cargo item and the second cargo item by the bidirectional latching device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
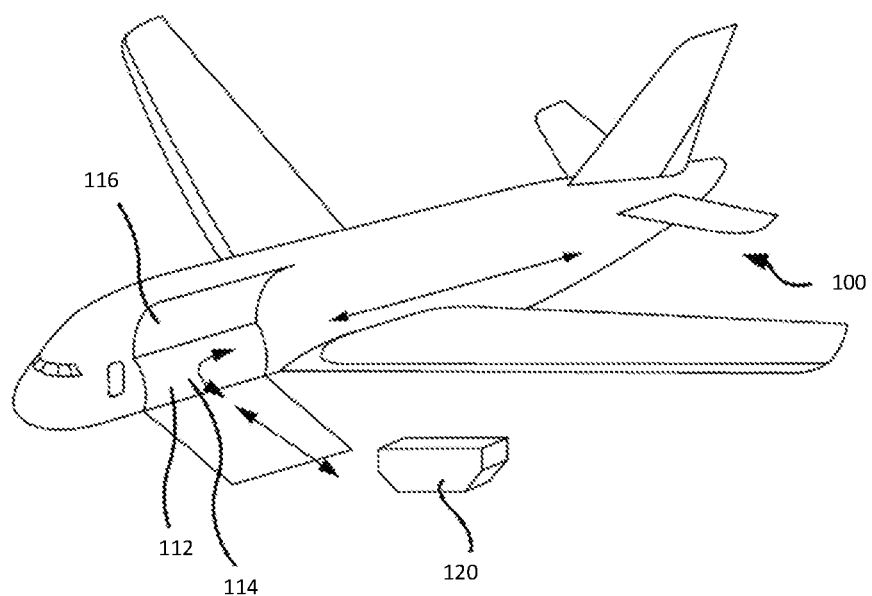
FIG. 1 illustrates a schematic view of an aircraft having a cargo deck located within a cargo compartment, in accordance with various embodiments.

With reference to FIG. 1, a schematic view of an aircraft 100 having a cargo deck 112 located within a cargo compartment 114 is illustrated, in accordance with various embodiments. The aircraft 100 may comprise a cargo load door 116 located, for example, at one side of a fuselage structure of the aircraft 100. A unit load device (ULD) 120, in the form of a container or pallet, for example, may be loaded through the cargo load door 116 and onto the cargo deck 112 of the aircraft 100 or, conversely, unloaded from the cargo deck 112 of the aircraft 100. In general, ULDs are available in various sizes and capacities, and are typically standardized in dimension and shape. Once loaded with items destined for shipment, the ULD 120 is transferred to the aircraft 100 and then loaded onto the aircraft 100 through the cargo load door 116 using a conveyor ramp, scissor lift or the like. Once inside the aircraft 100, the ULD 120 is moved within the cargo compartment 114 to a final stowed position. Multiple ULDs may be brought on-board the aircraft 100, with each ULD 120 being placed in a respective stowed position on the cargo deck 112. After the aircraft 100 has reached its destination, each ULD 120 is unloaded from the aircraft 100 in similar fashion, but in reverse sequence to the loading procedure. To facilitate securement of the ULD 120 to the cargo deck 112, the aircraft 100 may include latches, such as bidirectional latching devices as described herein in accordance with various embodiments.

As mentioned, cargo frequently is desired to be secured by a latch. A latch may be attached to a floor or wall of a cargo compartment and selectably engaged with one or more item of cargo. In various embodiments, cargo, such as a ULD, may be secured to constraint the movement of the cargo in different directions of movement. For instance, cargo may be desired to be prevented from moving forward and aft or left and right. Cargo may be desired to be prevented from lifting from the floor. This disclosure recites latches that can secure cargo in multiple directions of movement with a single latch and provide for rapid engagement and disengagement of the latch.

Figure 2:
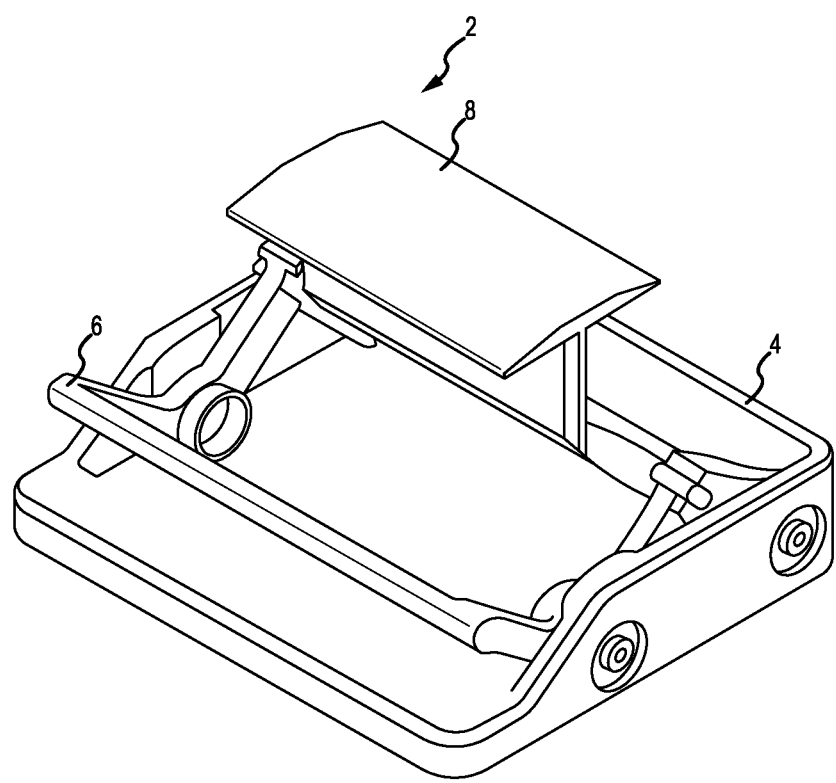
FIG. 2 illustrates an example bidirectional latching device, in accordance with various embodiments.

With attention to FIG. 2, a bidirectional latching device 2 is provided. The bidirectional latching device 2 may have a latch head 8. Latch head 8 may comprise a structure that can be moved to engage with a feature on a cargo item to be constrained and that can also be moved to disengage with the feature on the cargo item to be constrained. The latch head 8 may be rotatably fixed to other features of the bidirectional latching device 2 and may rotate in a first direction to an extended position (a latched position) for engagement with cargo and may rotate in a second direction to an unlatched position for disengagement with the cargo, and may rotate further in the second direction to a stowed position and also for disengagement with the cargo. The latch head 8 may be lockable in the extended (latched) position so that it does not inadvertently disengage from the cargo and so that it may interact with the cargo to react forces exerted thereby and limit movement of the cargo. The latch head 8 may be lockable in the stowed position so that it is disposed out of the way of cargo. In various embodiments, the latch head 8 is not lockable in the stowed position. In various embodiments, the latch head 8 is spring loaded to tend toward the stowed position.

The bidirectional latching device 2 may have a latch catch assembly 6. The latch catch assembly 6 may selectably engage with the latch head 8 so that latch head 8 is prevented from movement (e.g., rotation in the first direction and the second direction). The latch catch assembly 6 may selectably disengage from the latch head 8 so that the latch head 8 is permitted to move (e.g., rotate in the first direction and the second direction). The latch catch assembly 6 is operable to prevent rotation in both the first direction and the second direction. In addition, a shape of features of the latch head 8 may further facilitate preventing movement of the cargo in multiple directions of movement when in the latched position.

The bidirectional latching device 2 may have a base 4. The base 4 comprises a platform that is connected to both the latch catch assembly 6 and the latch head 8. The base 4 fixes the latch catch assembly 6 and latch head 8 in fixed relative orientations by providing hinges that space the latch catch assembly 6 and the latch head 8 apart and allow the latch catch assembly 6 and the latch head 8 to rotate and interact. The base 4 reacts to forces exerted by the latch catch assembly 6 and latch head 8 as they interact with each other and as they interact with cargo. As mentioned, the base 4 may have rotational attachments, such as hinges or apertures. The latch catch assembly 6 may be rotational attached to the base 4 by one or more hinge or pin and aperture. The latch head 8 may be rotationally attached to the base 4 by one or more hinge or pin and aperture. In various embodiments, the base 4 is attachable to a vehicle structure, such as a floor of a cargo compartment of a vehicle.

Figure 3A:
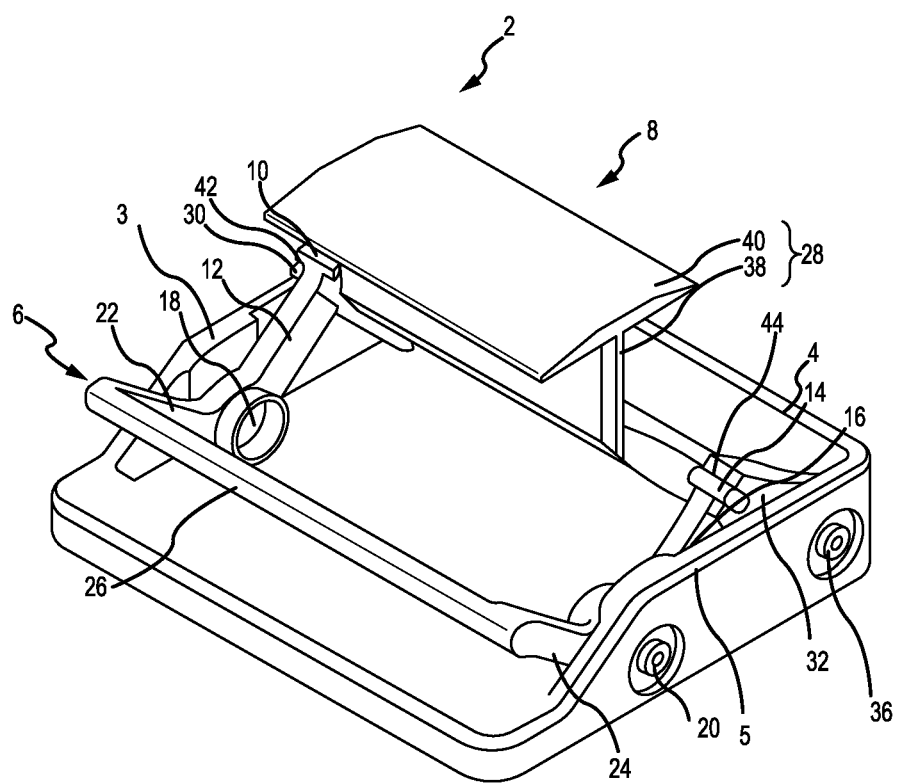
FIGS. 3A-B illustrate further components of example bidirectional latching devices, in accordance with various embodiments.
Figure 3B:
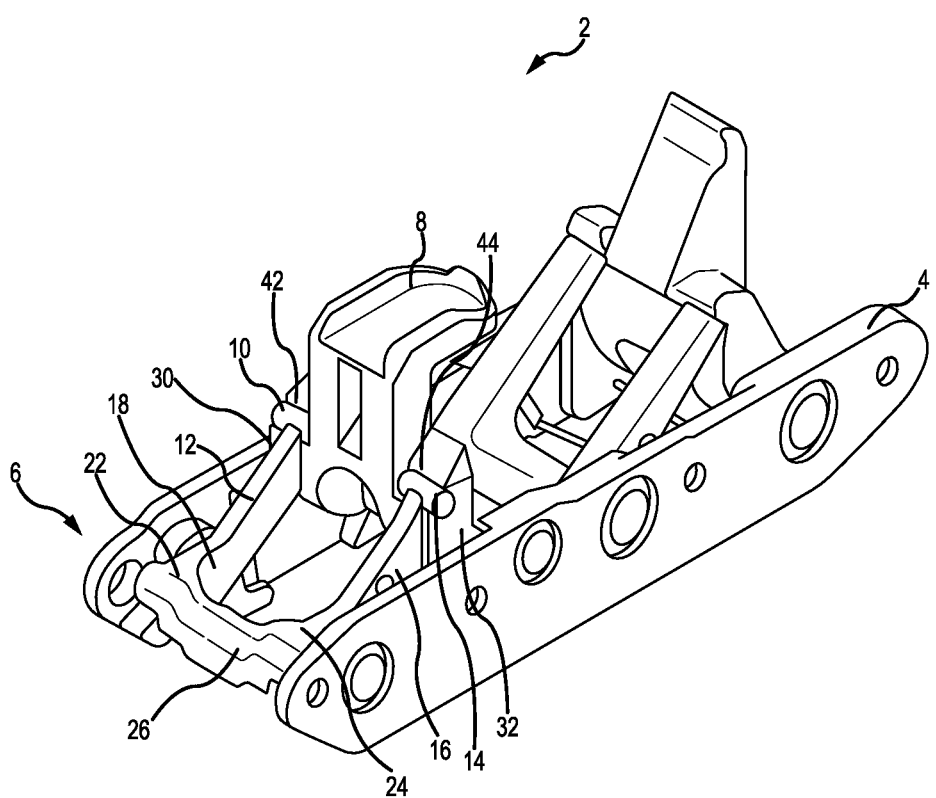

With reference now to FIGS. 3A-3B, further aspects of the latch catch assembly 6 and the latch head 8 are detailed. In various embodiments, the latch catch assembly 6 includes a first pawl 10. A first pawl 10 comprises a boss, localized thickening, tab, or other structure disposed at an end of a first pawl arm 12. The first pawl 10 inserts into an aspect of the latch head 8, to engage with the latch head 8 and limit movement of the latch head 8 relative to the first pawl 10.

The first pawl arm 12 that supports the first pawl 10 is an arm that rotatably extends from a first hinge 18 connecting the first pawl arm 12 to the base 4 at a first end and to the first pawl 10 at a second end. The first hinge 18 may be disposed on a first side 3 of the base 4 so that the first pawl arm 12 connects to the first side 3 of the base 4. As the first pawl arm 12 rotates about the first hinge 18, the first pawl 10 comes into engaging relation with the latch head 8 and out of engaging relation with the latch head 8 so that the movement of the latch head 8 is limited relative to the first pawl 10 or not limited relative to the first pawl 10.

The latch catch assembly 6 also includes a first handle arm 22. The first handle arm 22 is an arm that rotatably extends from the first hinge 18 at the first end of the first pawl arm 12 and away from the first hinge 18. The first handle arm 22 may extend from the first hinge 18 at an angle relative to the first pawl arm 12. The angle may be an acute angle. In other instances, the angle may be a right angle or an obtuse angle or a parallel angle. Because the first hinge 18 may be disposed on a first side 3 of the base 4, the first handle arm 22 connects to the first side 3 of the base 4. The first handle arm 22 may support a handle 26 at a second end. A user may press the handle 26 to exert a force on the first handle arm 22 that causes the first hinge 18 to rotate. As the first hinge 18 rotates, the first pawl arm 12 is moved about the first hinge 18, causing the first pawl 10 to come into engaging relation with the latch head 8 and out of engaging relation with the latch head 8.

In various embodiments, the latch catch assembly 6 includes a second pawl 14. The second pawl 14 comprises a boss, localized thickening, tab, or other structure disposed at an end of a second pawl arm 16. The second pawl 14 inserts into an aspect of the latch head 8, to engage with the latch head 8 and limit movement of the latch head 8 relative to the second pawl 14.

The second pawl arm 16 that supports the second pawl 14 is an arm that rotatably extends from a second hinge 20 connecting the second pawl arm 16 to the base 4 at a first end and to the second pawl 14 at a second end. The second hinge 20 may be disposed on a second side 5 of the base 4 so that the second pawl arm 16 connects to the second side 5 of the base 4. As the second pawl arm 16 rotates about the second hinge 20, the second pawl 14 comes into engaging relation with the latch head 8 and out of engaging relation with the latch head 8 so that the movement of the latch head 8 is limited relative to the second pawl 14 or not limited relative to the second pawl 14.

The latch catch assembly 6 also includes a second handle arm 24. The second handle arm 24 is an arm that extends from the second hinge 20 at the first end of the second pawl arm 16 and away from the second hinge 20. The second handle arm 24 may extend from the second hinge 20 at an angle relative to the second pawl arm 16. The angle may be an acute angle. In other instances, the angle may be a right angle or an obtuse angle or a parallel angle. Because the second hinge 20 may be disposed on a second side 5 of the base 4, the second handle arm 24 connects to the second side 5 of the base 4. The second handle arm 24 may support a handle 26 at a second end. The handle 26 may extend between the end of the first handle arm 22 opposite the first latch head hinge 34 and the end of the second handle arm 24 opposite the second latch head hinge 36, wherein the first handle arm 22 and the second handle arm 24 are parallel and spaced apart. A user may press the handle 26 to exert a force on the second handle arm 24 that causes the second hinge 20 to rotate. As the second hinge 20 rotates, the second pawl arm 16 is moved about the second hinge 20, causing the second pawl 14 to come into engaging relation with the latch head 8 and out of engaging relation with the latch head 8.

The latch head 8 also includes additional features. Various features of the latch head 8 engage with or interact with the features of the latch catch assembly 6 described above. In various embodiments, the latch head 8 includes a first force reaction arm 30. The first force reaction arm 30 defines a first locking slot 42 disposed at an end of a first force reaction arm 30. The first force reaction arm 30 receives the first pawl 10 into the first locking slot 42, to engage with the latch catch assembly 6 and limit movement of the latch head 8 relative to the latch catch assembly 6.

The first force reaction arm 30 that defines the first locking slot 42 is an arm that rotatably extends from a first latch head hinge 34 connecting the first force reaction arm 30 to the base 4 at a first end and defining the first locking slot 42 at a second end. The first latch head hinge 34 may be disposed on a first side 3 of the base 4 so that the first force reaction arm 30 connects to the first side 3 of the base 4. As the first force reaction arm 30 rotates about the first latch head hinge 34, the first locking slot 42 comes into engaging relation with the latch catch assembly 6 and out of engaging relation with the latch catch assembly 6 so that the movement of the latch head 8 is limited relative to the first pawl 10 or not limited relative to the first pawl 10.

In various embodiments, the latch head 8 includes a second force reaction arm 32. The second force reaction arm 32 defines a second locking slot 44 disposed at an end of the second force reaction arm 32. The second force reaction arm 32 receives the second pawl 14 into the second locking slot 44, to engage with the latch catch assembly 6 and limit movement of the latch head 8 relative to the latch catch assembly 6.

The second force reaction arm 32 that defines the second locking slot 44 is an arm that rotatably extends from a second latch head hinge 36 connecting the second force reaction arm 32 to the base 4 at a first end and defining the second locking slot 44 at a second end. The second latch head hinge 36 may be disposed on a second side 5 of the base 4 so that the second force reaction arm 32 connects to the second side 5 of the base 4. As the second force reaction arm 32 rotates about the second latch head hinge 36, the second locking slot 44 comes into engaging relation with the latch catch assembly 6 and out of engaging relation with the latch catch assembly 6 so that the movement of the latch head 8 is limited relative to the second pawl 14 or not limited relative to the second pawl 14. The second force reaction arm 32 and the first force reaction arm 30 may be parallel and spaced apart.

Finally, the latch head 8 may include a cargo retention flange 28. The cargo retention flange 28 may comprise a rigid member configured to interact with an item of cargo to restrain movement of the item in one or more direction of movement. For instance, the cargo retention flange 28 may react forces from the item of cargo as the item jostles against the cargo retention flange 28. The cargo retention flange 28 may be bent so as to at least partially trap a feature of the cargo between the cargo retention flange 28 and the base 4. The cargo retention flange 28 may include one or more members. For instance, the cargo retention flange 28 may include two members arranged in an L-shape, or a T-shape, or a X-shape, or any shape as desired. In one example embodiment of a cargo retention flange 28 with two members, a cargo retention flange 28 may have a first dimensional restraint member 38 that extends in a first direction and a second dimensional restraint member 40 that extends in a second direction. The first and second directions may be perpendicular so that the first and second dimensional restraint members 38, 40 form a T-shape. For instance, a first dimensional restraint member 38 may extend upwardly away from the base 4 and the second dimensional restraint member 40 may extend parallel to the base 4 adjacent an end of the first dimensional restraint member 38. The combination of the first dimensional restraint member 38 and the second dimensional restraint member 40 may operate to resist translational movement of the item of cargo when the item of cargo tends to translate toward the first dimensional restraint member 38 and also resist elevation (e.g., lifting) of the cargo relative to a surface where the bidirectional latching device 2 is installed as the cargo lifts relative to the second dimensional restraint member 40 and is trapped between the second dimensional restraint member 40 and (a) the base 4, (b) a surface to which the bidirectional latching device 2 is attached such as a floor of a cargo area of a vehicle, or (c) another aspect.

Having separately introduced the latch catch assembly 6 and its components and the latch head 8 and its components, a discussion of various components that interact is helpful prior to a discussion of additional figures and the bidirectional latching device 2 configured in different latched, unlatched, and stowed configurations. Continuing with reference to FIGS. 3A-3B, the first hinge 18 and the first latch head hinge 34 may be spaced so that the first force reaction arm 30 and the first pawl arm 12 are at about a perpendicular angle when the first pawl 10 is in the first locking slot 42. Similarly, the second hinge 20 and the second latch head hinge 36 may be spaced so that the second force reaction arm 32 and the second pawl arm 16 are at about a perpendicular angle when the second pawl 14 is in the second locking slot 44. In addition, the first hinge 18 may be spring loaded to impel the first pawl 10 toward the first locking slot 42. The second hinge 20 may be spring loaded to impel the second pawl 14 toward the second locking slot 44. The first latch head hinge 34 and the second latch head hinge 36 are rotatable in concert in response to a force on the handle 26 extending between the first handle arm 22 and the second handle arm 24 to disengage the first pawl 10 from the first locking slot 42 and the second pawl 14 from the second locking slot 44.

The bidirectional latching device 2 has an extended position (latched position) in which the latch head 8 is locked in position for retaining cargo. The bidirectional latching device 2 has a stowed position in which the latch head 8 is in a stowed position (retracted to reduce a height of the device). When transitioning between an extended position and a stowed position, the bidirectional latching device 2 may have a unlatched position in which the latch head 8 is unlocked from the latch catch assembly 6 but is not stowed.

Figure 4A:
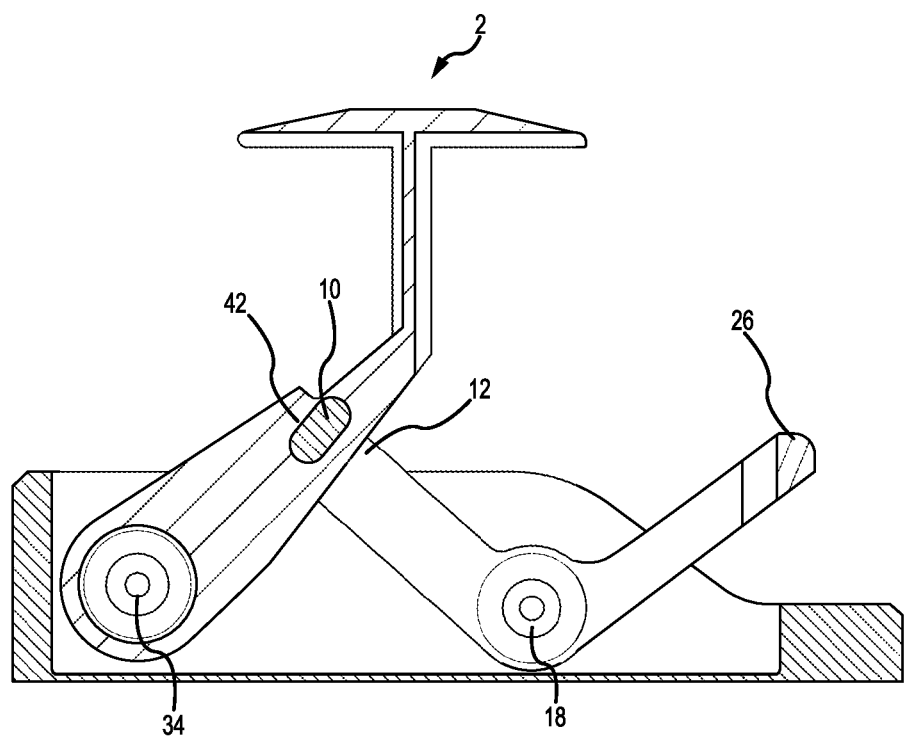
FIG. 4A-B illustrates side views of an example bidirectional latching device in a latched configuration, in accordance with various embodiments.
Figure 4B:
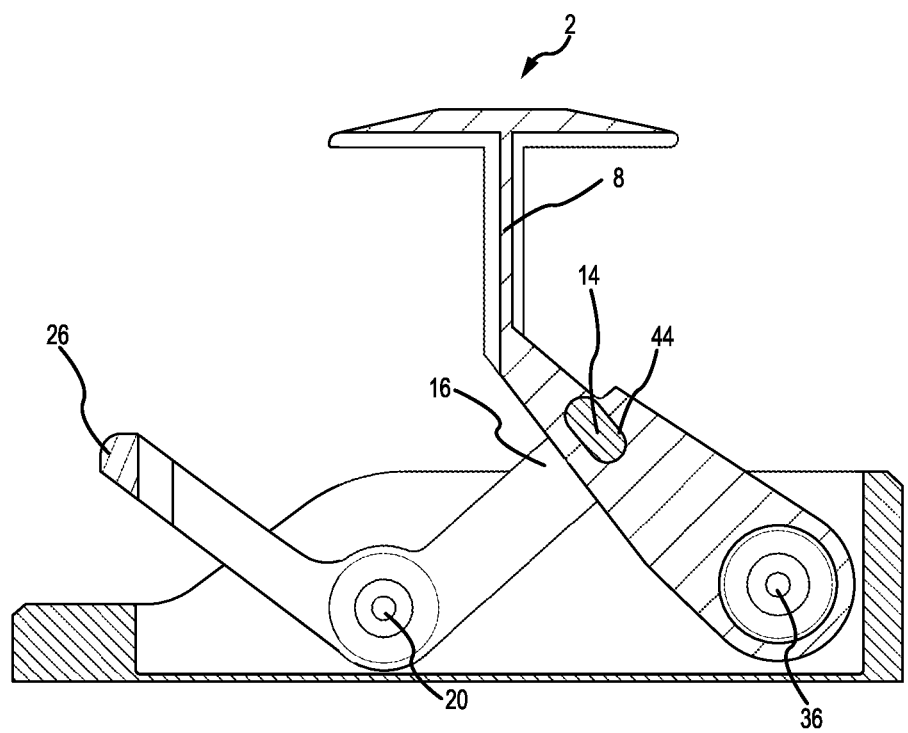

FIGS. 4A and 4B are opposite side views that show the bidirectional latching device 2 in an extended position in which the latch head 8 is locked in position for retaining cargo. The first pawl 10 at an end of the first pawl arm 12 is latched into the first locking slot 42. First latch head hinge 34 and first hinge 18 permit pressing of the handle 26 to lift the first pawl 10 from the first locking slot 42 so that the latch head 8 can rotate clockwise or counterclockwise. In various instances, the first latch head hinge 34 is spring loaded to cause the latch head 8 to rotate to a stowed position. The second pawl 14 at an end of the second pawl arm 16 is latched into the second locking slot 44. Second latch head hinge 36 and second hinge 20 permit pressing of the handle 26 to lift the second pawl 14 from the second locking slot 44 so that the latch head 8 can rotate clockwise or counterclockwise. In various instances, the second latch head hinge 36 is spring loaded to cause the latch head 8 to rotate to a stowed position.

Figure 5A:
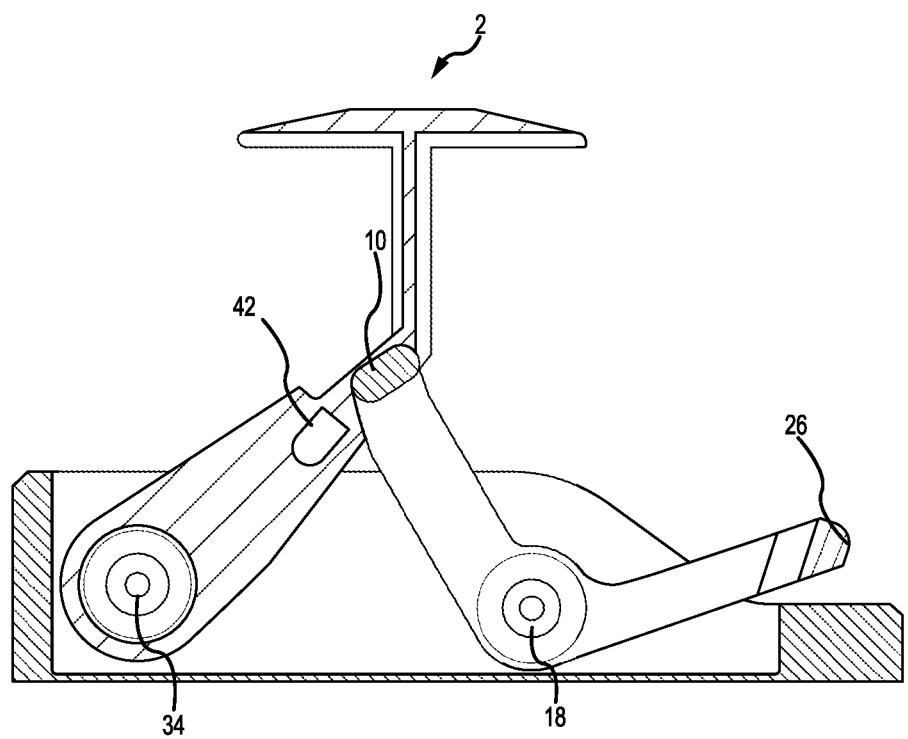
FIG. 5A-B illustrates side views of an example bidirectional latching device in an unlatched configuration, in accordance with various embodiments.
Figure 5B:
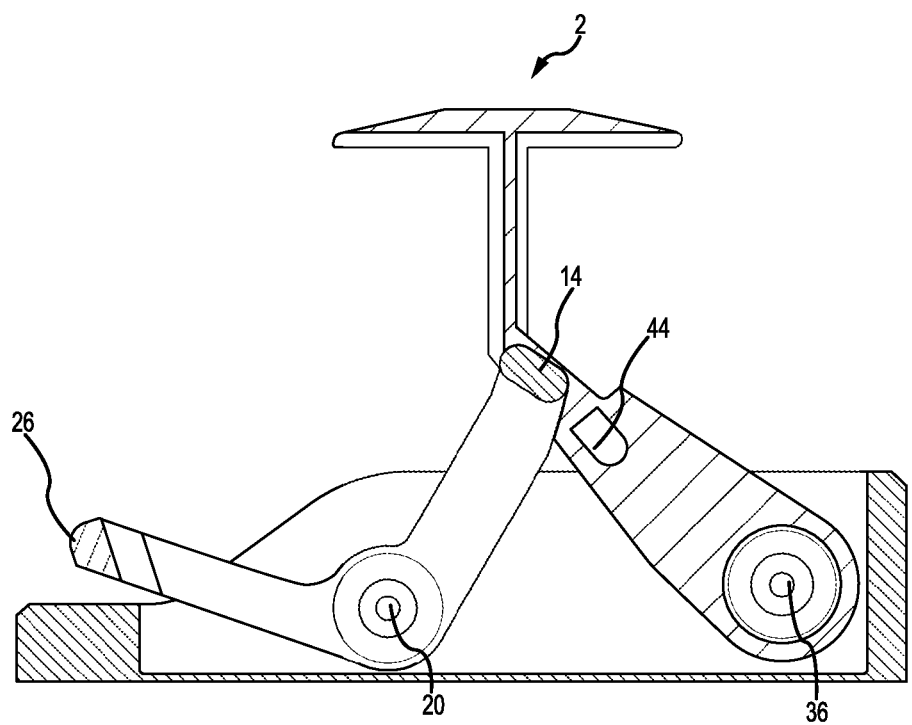

FIGS. 5A and 5B are opposite side views that show the bidirectional latching device 2 in an unlatched position in which the latch head 8 is unlocked but has not been moved to a stowed position. The first pawl 10 at an end of the first pawl arm 12 is lifted out of the first locking slot 42. First latch head hinge 34 and first hinge 18 permit pressing of the handle 26 to lift the first pawl 10 from the first locking slot 42 so that the latch head 8 can rotate clockwise or counterclockwise. The second pawl 14 at an end of the second pawl arm 16 is lifted out of the second locking slot 44. Second latch head hinge 36 and second hinge 20 permit pressing of the handle 26 to lift the second pawl 14 from the second locking slot 44 so that the latch head 8 can rotate clockwise or counterclockwise.

Figure 6A:
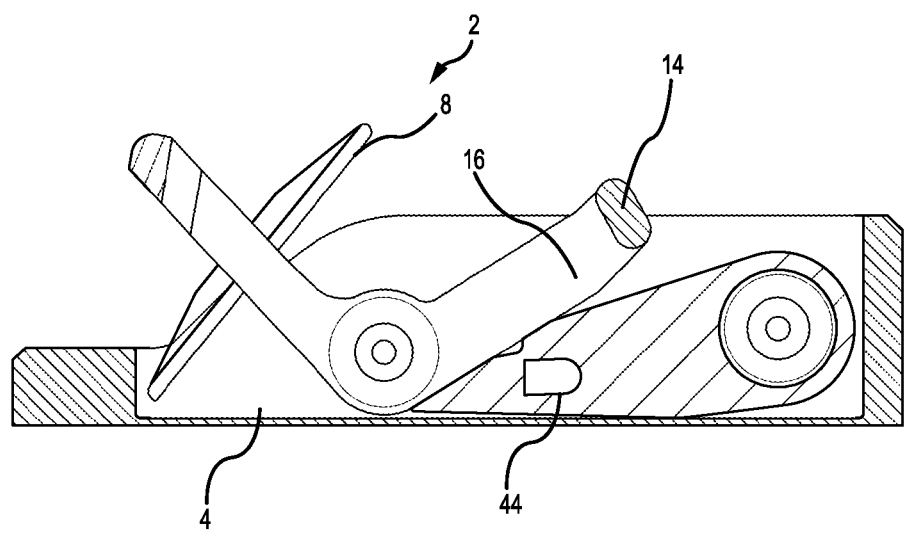
FIG. 6A-B illustrates side views of an example bidirectional latching device in a stowed configuration, in accordance with various embodiments.
Figure 6B:
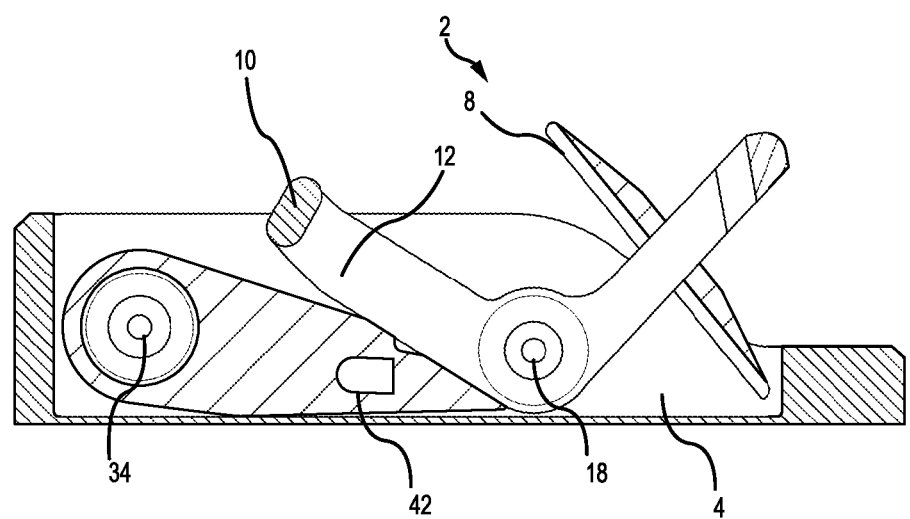

FIGS. 6A and 6B are opposite side views that show the bidirectional latching device 2 in a stowed position in which the latch head 8 is stowed in a retracted position to reduce a height of the bidirectional latching device 2 when not in use. The first pawl 10 at an end of the first pawl arm 12 is out of the first locking slot 42. The second pawl 14 at an end of the second pawl arm 16 is out of the second locking slot 44. The latch head 8 rests against the base 4.

Figure 7:
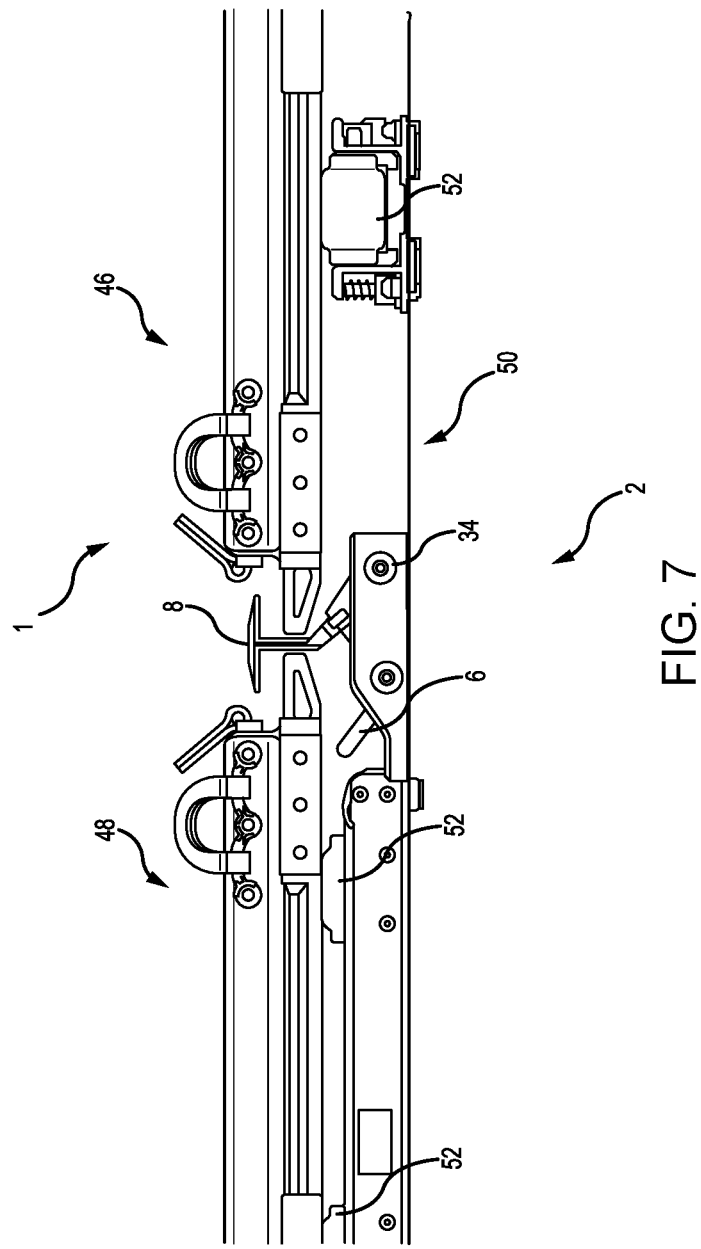
FIG. 7 illustrates side views of an example use scenario for a bidirectional latching device, in accordance with various embodiments.

FIG. 7 shows an example use scenario for a bidirectional latching device 2. Specifically, FIG. 7 illustrates an aircraft cargo retention system 1. A cargo compartment floor 50 of an aircraft is provided with a plurality of rollers 52 attached to the cargo compartment floor 50. The rollers 52 provide support to a first cargo item 46 and a second cargo item 48. A bidirectional latching device 2 is attached to the cargo compartment floor 50 and is configured to selectably extend upward from the cargo compartment floor 50 to restrict lateral movement and up-and-down movement of both the first cargo item 46 and the second cargo item 48. For instance, a latch head 8 of the bidirectional latching device 2 extends upward from the cargo compartment floor 50 and restricts lifting movement in one degree of freedom (direction of movement) and translation movement in another degree of freedom (direction of movement). The latch head 8 may have a T-shape and may be rotatable about a first latch head hinge 34. A latch catch assembly 6 is configured to selectably engage with the latch head 8 to prevent rotation of the latch head 8 about the first latch head hinge 34 while restricting the lateral movement and the up-and-down movement of both the first cargo item 46 and the second cargo item 48.

Figure 8:
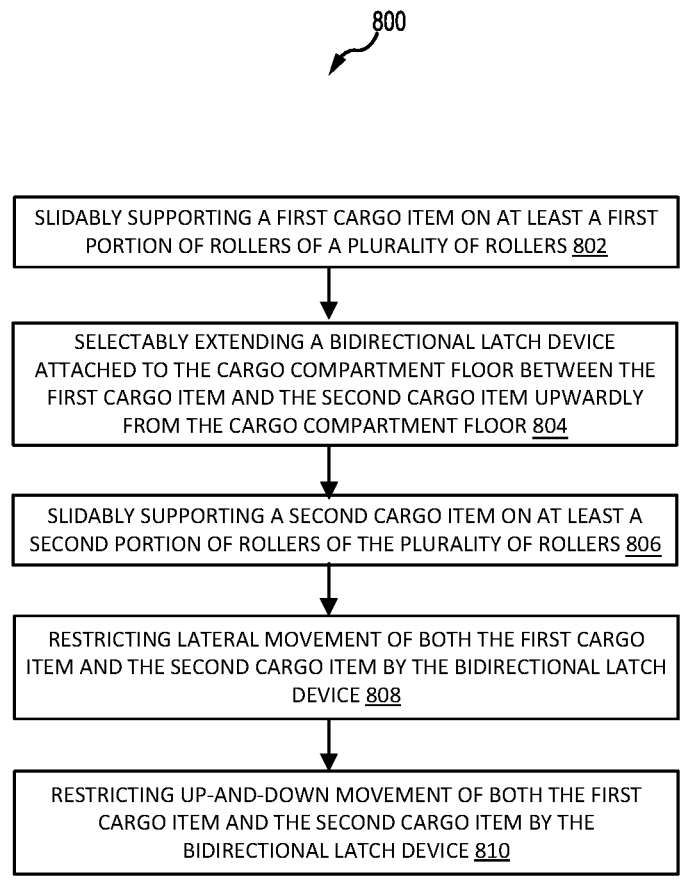
FIG. 8 illustrates a block diagram of a method of securing cargo to a cargo compartment floor of an aircraft with a bidirectional latching device, in accordance with various embodiments.

With reference to FIG. 8, a method 800 of securing cargo to a cargo compartment floor of an aircraft is provided. The method may include slidably supporting a first cargo item on at least a portion of rollers of a plurality of rollers (block 802). The method may include selectably extending a bidirectional latching device attached to the cargo compartment floor between the first cargo item and the second cargo item upwardly from the cargo compartment floor (block 804). The method may include slidably supporting a second cargo item on at least a second portion of rollers of the plurality of rollers (block 806). The method may include restricting lateral movement of both the first cargo item and the second cargo item by the bidirectional latching device (block 808). Finally, the method may include restricting up-and-down movement of both the first cargo item and the second cargo item by the bidirectional latching device (block 810).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A bidirectional latching device for securing a cargo in a vehicle comprising:
   a latch catch assembly comprising:

a first pawl arm comprising an arm rotatably extending from a first hinge at a first end of the arm and having a first pawl adjacent a second end of the arm;

a latch head comprising:

a first force reaction arm comprising an arm rotatably extending from a first latch head hinge at a first end of the arm, the first force reaction arm defining a first locking slot adjacent a second end of the first force reaction arm, the first locking slot configured to receive the first pawl to prevent rotation of the first force reaction arm about the first latch head hinge in both clockwise and counterclockwise directions; and a cargo retention flange extending outwardly from a second end of the first force reaction arm, the cargo retention flange configured to restrict movement of the cargo proximate to the bidirectional latching device in response to the receiving the first pawl into the first locking slot.

2. The bidirectional latching device of claim 1, wherein the cargo retention flange comprises:

a first dimensional restraint member to restrict movement of the cargo in a first direction of movement; and a second dimensional restraint member perpendicular to the first dimensional restraint member to restrict movement of the cargo in a second direction of movement that is perpendicular to the first direction of movement.

3. The bidirectional latching device of claim 2, wherein the first dimensional restraint member and the second dimensional restraint member form a T-shape.

4. The bidirectional latching device of claim 1, further comprising a base, the base comprising a platform supporting the first hinge and the first latch head hinge in fixed spaced apart relation as the first hinge rotates and the first latch head hinge rotates independently of the first hinge.

5. The bidirectional latching device of claim 4, wherein the first hinge and the first latch head hinge are spaced so that the first force reaction arm and the first pawl arm are at about a perpendicular angle when the first pawl is in the first locking slot.

6. The bidirectional latching device of claim 4, wherein the latch catch assembly further comprises a first handle arm extending from the first latch head hinge, wherein the first handle arm extends at an acute angle relative to the first force reaction arm.

7. The bidirectional latching device of claim 6, further comprising a handle disposed at an end of the first handle arm opposite the first latch head hinge.

8. The bidirectional latching device of claim 7, wherein the first handle arm and the first force reaction arm both extend away from the base.

9. The bidirectional latching device of claim 8, wherein the first hinge is spring loaded to impel the first pawl toward the first locking slot.

10. The bidirectional latching device of claim 9, wherein the first latch head hinge is rotatable in response to a force on the first handle arm to disengage the first pawl from the first locking slot.

11. The bidirectional latching device of claim 1, wherein the latch catch assembly further comprises a second pawl arm comprising an arm rotatably extending from a second hinge at a first end of the arm and having a second pawl adjacent a second end of the arm, wherein the latch head further comprises a second force reaction arm comprising an arm rotatably extending from a second latch head hinge at a first end of the arm, wherein the second force reaction arm defines a second locking slot adjacent a second end of the second force reaction arm to receive the second pawl into the second locking slot to prevent rotation of the second force reaction arm about the second latch head hinge in both clockwise and counterclockwise directions, and wherein a base comprising a platform further supports the second hinge and the second latch head hinge in fixed spaced apart relation as the second hinge rotates and the second latch head hinge rotates independently of the first hinge.

12. The bidirectional latching device of claim 11, wherein the first hinge and the second hinge rotate in concert and wherein the first latch head hinge and the second latch head hinge rotate in concert.

13. The bidirectional latching device of claim 12, wherein the latch catch assembly further comprises a second handle arm extending from the second latch head hinge, wherein the second handle arm extends at an acute angle relative to the second force reaction arm.

14. The bidirectional latching device of claim 13, wherein a handle extends between an end of a first handle arm opposite the first latch head hinge and an end of the second handle arm opposite the second latch head hinge, wherein the first handle arm and the second handle arm are parallel and spaced apart.

15. The bidirectional latching device of claim 14, wherein the second handle arm and the second force reaction arm both extend away from the base, wherein the second force reaction arm and the first force reaction arm are parallel and spaced apart.

16. The bidirectional latching device of claim 15, wherein the second hinge is spring loaded to impel the second pawl toward the second locking slot.

17. The bidirectional latching device of claim 16, wherein the first latch head hinge and the second latch head hinge are rotatable in concert in response to a force on the handle extending between the first handle arm and the second handle arm to disengage the first pawl from the first locking slot and the second pawl from the second locking slot.

18. An aircraft cargo retention system comprising:

a cargo compartment floor of an aircraft;

a plurality of rollers attached to the cargo compartment floor to support a first cargo item and a second cargo item; and a bidirectional latching device attached to the cargo compartment floor and configured to selectably extend upward from the cargo compartment floor to restrict lateral movement and up-and-down movement of both the first cargo item and the second cargo item, wherein the bidirectional latching device comprises:

a latch head having a T-shape and extending upwardly from the cargo compartment floor, wherein the latch head is rotatable about a first latch head hinge; and a latch catch assembly configured to selectably engage with the latch head to prevent rotation of the latch head about the first latch head hinge while restricting the lateral movement and the up-and-down movement of both the first cargo item and the second cargo item.

19. A method of securing cargo in a cargo compartment floor of an aircraft comprising:

slidably supporting a first cargo item on at least a first portion of rollers of a plurality of rollers;

selectably extending a bidirectional latching device attached to the cargo compartment floor between the first cargo item and a second cargo item upwardly from the cargo compartment floor;

slidably supporting the second cargo item on at least a second portion of rollers of the plurality of rollers;
restricting lateral movement of both the first cargo item and the second cargo item by the bidirectional latching device; and
restricting up-and-down movement of both the first cargo item and the second cargo item by the bidirectional latching device.

\* \* \* \* \*